(12) United States Patent
Floersch et al.

(10) Patent No.: US 9,968,188 B1
(45) Date of Patent: May 15, 2018

(54) LOCKING BASE FOR TABLET STAND

(71) Applicant: Engineered Network Systems, LLC, Burnsville, MN (US)

(72) Inventors: Peter J. Floersch, Lakeville, MN (US); Stephen A. Nistler, Eagan, MN (US); Aaron Z. Mclaughlin, Saint Paul, MN (US); Paul M. Smith, Apple Valley, MN (US)

(73) Assignee: Engineered Network Systems, LLC, Burnsville, MN (US)

( * ) Notice: Subject to any disclaimer, the term of this patent is extended or adjusted under 35 U.S.C. 154(b) by 0 days. days.

(21) Appl. No.: 15/206,375

(22) Filed: Jul. 11, 2016

(51) Int. Cl.
| | |
|---|---|
| *A47B 23/04* | (2006.01) |
| *F16M 11/08* | (2006.01) |
| *F16B 3/06* | (2006.01) |
| *F16M 11/20* | (2006.01) |
| *F16M 11/10* | (2006.01) |
| *F16M 13/02* | (2006.01) |
| *F16B 21/16* | (2006.01) |
| *F16M 13/00* | (2006.01) |
| *F16M 11/04* | (2006.01) |
| *F16M 11/28* | (2006.01) |

(52) U.S. Cl.
CPC ............ *A47B 23/04* (2013.01); *F16B 3/06* (2013.01); *F16M 11/08* (2013.01); *F16M 11/10* (2013.01); *F16M 11/2014* (2013.01); *F16M 13/02* (2013.01); *F16B 21/16* (2013.01); *F16C 2226/16* (2013.01); *F16M 11/041* (2013.01); *F16M 11/28* (2013.01); *F16M 13/00* (2013.01); *F16M 2200/022* (2013.01)

(58) Field of Classification Search
CPC ............ F16M 11/14; F16M 2200/022; F16M 11/2014; F16M 11/041; F16M 11/28; F16M 2200/08; F16M 11/08; F16M 13/022; F16M 2200/027; F16M 11/06; F16M 13/00; F16M 11/18; F16M 11/04; F16C 2226/16; F16C 1/09
USPC .... 248/74.1, 74.4, 154, 176.1, 181.1, 181.2, 248/186.1, 186.2, 316.2, 420, 425; 403/90, 261, 297, 309, 344, 361, 367, 403/371, 374.1, 385
See application file for complete search history.

(56) References Cited

U.S. PATENT DOCUMENTS

| | | | | |
|---|---|---|---|---|
| 2,030,370 A | * | 2/1936 | Hodtum ................. | H01B 17/58 174/153 R |
| 2,072,877 A | * | 3/1937 | Green ..................... | F41A 27/08 248/186.2 |
| 3,211,406 A | * | 10/1965 | Averett .................. | F16M 11/10 248/183.1 |
| 3,356,325 A | * | 12/1967 | Schnase ............... | F16M 11/041 248/187.1 |
| 3,891,294 A | * | 6/1975 | Philibert .............. | H02G 3/0683 174/663 |
| 3,912,306 A | * | 10/1975 | McCormick ........ | F01N 13/1805 285/12 |
| 3,912,412 A | * | 10/1975 | Struttmann ........... | F16C 35/073 384/538 |

(Continued)

*Primary Examiner* — Stanton L Krycinski
*Assistant Examiner* — Taylor L Morris
(74) *Attorney, Agent, or Firm* — Haugen Law Firm PLLP

(57) ABSTRACT

A lockable electronic tablet stand is described that allows rotation and fixes the tablet stand in a locked relation. The stand includes a base that allows the tablet stand to rotate about the base while cords extend through a center of the base.

18 Claims, 16 Drawing Sheets

(56) References Cited

U.S. PATENT DOCUMENTS

| | | | | |
|---|---|---|---|---|
| 4,019,824 A * | 4/1977 | Percy | ................. | F16B 3/06 |
| | | | | 403/261 |
| 4,068,818 A | 1/1978 | Gates | | |
| 4,128,064 A * | 12/1978 | Chung | ................. | A47B 57/265 |
| | | | | 108/147.13 |
| 4,393,998 A * | 7/1983 | Allen | ................. | F16L 3/18 |
| | | | | 156/306.9 |
| 4,515,336 A * | 5/1985 | Fischer | ................. | F16C 11/0619 |
| | | | | 248/288.51 |
| 4,527,818 A | 7/1985 | Rundell | | |
| 4,730,818 A * | 3/1988 | Price | ................. | B23Q 1/545 |
| | | | | 267/75 |
| 5,082,254 A | 1/1992 | Hunnell et al. | | |
| 5,154,532 A * | 10/1992 | Schaefer | ................. | F04B 53/147 |
| | | | | 403/301 |
| 5,201,222 A * | 4/1993 | Johnson | ................. | B64D 11/02 |
| | | | | 73/290 V |
| 5,335,142 A * | 8/1994 | Anderson | ................. | F16M 11/10 |
| | | | | 248/183.2 |
| 5,527,010 A | 6/1996 | Kao | | |
| 5,720,465 A | 2/1998 | Peltzer et al. | | |
| 6,027,257 A * | 2/2000 | Richards | ................. | F16M 11/10 |
| | | | | 248/183.1 |
| 6,053,656 A * | 4/2000 | Heilig | ................. | B62D 1/10 |
| | | | | 403/362 |
| 6,139,069 A | 10/2000 | Radzik | | |
| 6,234,690 B1 * | 5/2001 | Lemieux | ................. | F16M 11/041 |
| | | | | 248/187.1 |
| 6,343,006 B1 * | 1/2002 | Moscovitch | ................. | B60R 11/02 |
| | | | | 348/794 |
| 6,672,631 B1 | 1/2004 | Weinhold | | |
| 6,779,944 B2 * | 8/2004 | Schnorrer | ................. | B23K 37/0531 |
| | | | | 285/420 |
| 6,857,610 B1 | 2/2005 | Connor et al. | | |
| 6,924,432 B1 * | 8/2005 | Connors | ................. | H02G 3/22 |
| | | | | 174/19 |
| 6,942,489 B2 * | 9/2005 | Tiesler | ................. | H01R 13/6275 |
| | | | | 248/343 |
| 7,182,771 B1 | 2/2007 | Houser et al. | | |
| 7,320,450 B2 * | 1/2008 | Carnevali | ................. | F16M 11/40 |
| | | | | 248/121 |
| 7,339,158 B2 * | 3/2008 | Mutschler | ................. | G01D 11/00 |
| | | | | 250/231.13 |
| 7,384,021 B2 * | 6/2008 | Liao | ................. | F16M 11/08 |
| | | | | 248/176.3 |
| 7,434,774 B1 * | 10/2008 | Floersch | ................. | F16M 11/10 |
| | | | | 248/183.1 |
| 7,451,958 B2 * | 11/2008 | Ritter | ................. | B60N 2/146 |
| | | | | 248/415 |
| 7,658,556 B2 * | 2/2010 | Johnson | ................. | F16M 11/02 |
| | | | | 248/177.1 |
| 7,690,606 B1 * | 4/2010 | Batdorf | ................. | B25B 1/22 |
| | | | | 248/181.1 |
| 7,708,239 B2 * | 5/2010 | Watanabe | ................. | F16M 11/08 |
| | | | | 248/125.7 |
| 7,984,886 B2 * | 7/2011 | Lin | ................. | B60R 11/0252 |
| | | | | 108/44 |
| 8,235,340 B2 * | 8/2012 | Carnevali | ................. | F16B 2/065 |
| | | | | 248/231.71 |
| 8,438,955 B2 | 5/2013 | Wilson, Jr. et al. | | |
| 8,462,103 B1 | 6/2013 | Moscovitch et al. | | |
| 8,789,802 B2 | 7/2014 | Springer et al. | | |
| 8,979,041 B2 | 3/2015 | Hennessey et al. | | |
| 9,127,795 B2 | 9/2015 | Chan | | |
| 9,185,953 B2 | 11/2015 | Whitten et al. | | |
| 9,194,523 B2 | 11/2015 | Ignaczak et al. | | |
| 9,229,494 B2 | 1/2016 | Rayner | | |
| 9,233,645 B2 | 1/2016 | Schofield et al. | | |
| 9,247,861 B2 | 2/2016 | Kan et al. | | |
| 9,267,638 B2 | 2/2016 | Le Gette et al. | | |
| 2006/0000957 A1 * | 1/2006 | Carnevali | ................. | F16M 11/14 |
| | | | | 248/181.1 |
| 2013/0181386 A1 * | 7/2013 | Hofmann | ................. | B23Q 1/0018 |
| | | | | 269/20 |
| 2013/0233988 A1 * | 9/2013 | Johnson | ................. | G03B 17/561 |
| | | | | 248/229.14 |
| 2014/0158490 A1 * | 6/2014 | Kasper | ................. | B23K 37/006 |
| | | | | 192/55.1 |
| 2015/0329062 A1 * | 11/2015 | Ackeret | ................. | B60R 11/02 |
| | | | | 248/220.22 |

\* cited by examiner

LOCKING BASE FOR TABLET STAND

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to a display or monitor support systems for electronic tablets. More particularly, the invention pertains to an articulating tablet mount support system having fixed wiring and a base that may either rotate freely or lock into a desired position, allowing the user to decisively position the display at multiple fixed angles and orientations. Further, the rotational lock mechanism withstands significant torque that may be applied by attempting to twist a display held in the support system.

BACKGROUND

Recently, electronic tablets have provided added mobility in contrast to desktop style microprocessor computers. For a variety of reasons many users desire mobility yet also want to be able to use the same device in a conventional way similar to a desktop personal computer. For example, in a retail market it has become popular for sales associates to carry light weight mobile devices or tablets that are wirelessly linked to a network. The tablets may be utilized as a marketing tool and provide additional information for the customer. At the same time, it may be desirable for the sales associate to use the tablet as a stationery computer with a wired connection to a secure network. When using the tablet as a stationery device the user may desire a stand that allows the user to adjust the vertical position, horizontal position, rotational orientation or a combination of these. Further, the user may desire a stand that may either rotate freely or lock in place in a manner that is not readily modified or tampered and that is capable of overcoming a torque provided by twisting of the display.

SUMMARY

Embodiments according to aspects of the invention provide a tablet support stand that includes a base having a conduit for fixed wires that couple to a tablet without interfering with the ability to rotate the base. The base may be mounted to a counter in a fixed relation while still allowing for rotation of the support stand. Further, the base also includes a constricting mechanism concealed within the support stand that allows a user to adjust the rotation of the base to a desired location and then simply tighten the base to lock the base in a fixed stationary position. Those skilled in the art will appreciate that the constricting mechanism restricts rotation even when significant torque results from a twisting of a tablet held in the stand. Instead of simply clamping onto a cylindrical column, the constricting mechanism provides a resistance on planar surfaces and increases a surface area of rotational resistance. Thus, a required moment of inertia must increase when the constricting mechanism applies more resistance to rotation along the planar surfaces.

In accordance with aspects of the invention, an embodiment of the invention includes a base and annular collar with an intermediate plate sandwiched between the base and collar. The base has a cylindrical column extending upward from the base that has a downward facing annular bevel formed on an upper, outer surface of the column. The expandable and contractible annular collar is sized to encompass and engage at least a portion of the column above the top surface of said intermediate plate. More specifically, the collar includes an annular chamfer formed on an inner top edge of the annular collar that engages the downward facing annular bevel of the column. The annular chamfer and the annular bevel are sized to engage together when the collar is contracted and a diameter of the collar is reduced. Further, reducing the diameter of the annular collar forces the collar downward towards a top surface of the intermediate plate and also forces the base against the underside of the intermediate plate. A significant resistance to rotation is provided by a small amount of contracting (tightening) of the annular collar and essentially squeezing of the intermediate plate.

A further aspect of the invention includes a stop lock that restricts rotation of the collar about the column so that the display is not able to rotate more than 360 degrees in the same direction. Thus, the stop lock further avoids a tangling and twisting of wires concealed in the column. Another aspect of the invention includes friction reducing spacer rings positioned between the intermediate plate, base, and collar. The annular collar may include a continuously adjustable tensioning member that corresponds with an increase or decrease in an inner diameter of the annular collar.

In accordance with an embodiment of the invention the apparatus securely supports an electronic tablet and includes a support base, a constriction collar, a support stand, and an intermediate plate sandwiched between the base and collar. The support stand is rigidly fixed to the intermediate plate and the annular collar is interlocked with the base. The base has a cylindrical column extending upward from the base, wherein the column has a downward facing annular bevel formed on an external upper surface of the column. The expandable and contractible annular collar has an annular chamfer formed on an inner top edge of the annular collar that mirrors the annular bevel of the column. The collar is sized to encompass and engage at least a portion of the column above the top surface of the intermediate plate. The annular chamfer and annular bevel are further sized to engage together when the collar is contracted and a diameter of the collar is reduced. Also, a reducing the diameter of the annular collar forces the collar downward towards a top surface of the intermediate plate. The intermediate plate has a top and bottom surface and an aperture extending through the plate from the top to bottom surface. The aperture is further dimensioned so that the column of the base extends through the aperture and a portion of the base is below the bottom surface of the intermediate plate.

A further aspect of the invention includes a display stand attached to the intermediate plate. A stop lock is provided that restricts rotation of the collar about the column so that the display stand is not able to rotate more than 360 degrees in the same direction. Another aspect of the invention includes friction reducing spacer rings positioned between the intermediate plate, base, and collar. The annular collar may include a continuously adjustable tensioning member that corresponds with an increase or decrease in an inner diameter of the annular collar.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The support system of the present invention is particularly well suited as a lockable and adjustable tablet support system. The support system may include a base, tablet stand and tablet holder, intermediate plate, and an expandable and contractible annular collar. In accordance with the present invention a user may position an electronic tablet in the tablet holder and then twist and rotate the tablet stand so that the tablet is oriented at a desired viewing angle. The user may then restrict rotation of the tablet stand by increasing the tension between the expandable and contractible annular collar. By applying tension to the collar, both an upward and downward force apply against the intermediate plate and the base and collar.

Those skilled in the art will appreciate that the various components of the invention may be constructed from suitable known materials, including for example without limitation, metal components fabricated from relatively strong and durable materials, such as nickel steel, carbon steel, galvanized steel, high grade aluminum, and the like. Additionally components that contact other moving components may preferably be made from materials having relatively low coefficients of friction in order to allow movement of the components parts when a tension is not applied to the collar. A particularly preferred material for these resistance reducing members is ultra-high molecular weight polyethylene (UHMWPE), though other polymeric materials may be used in place of UHMWPE.

Figure 1:
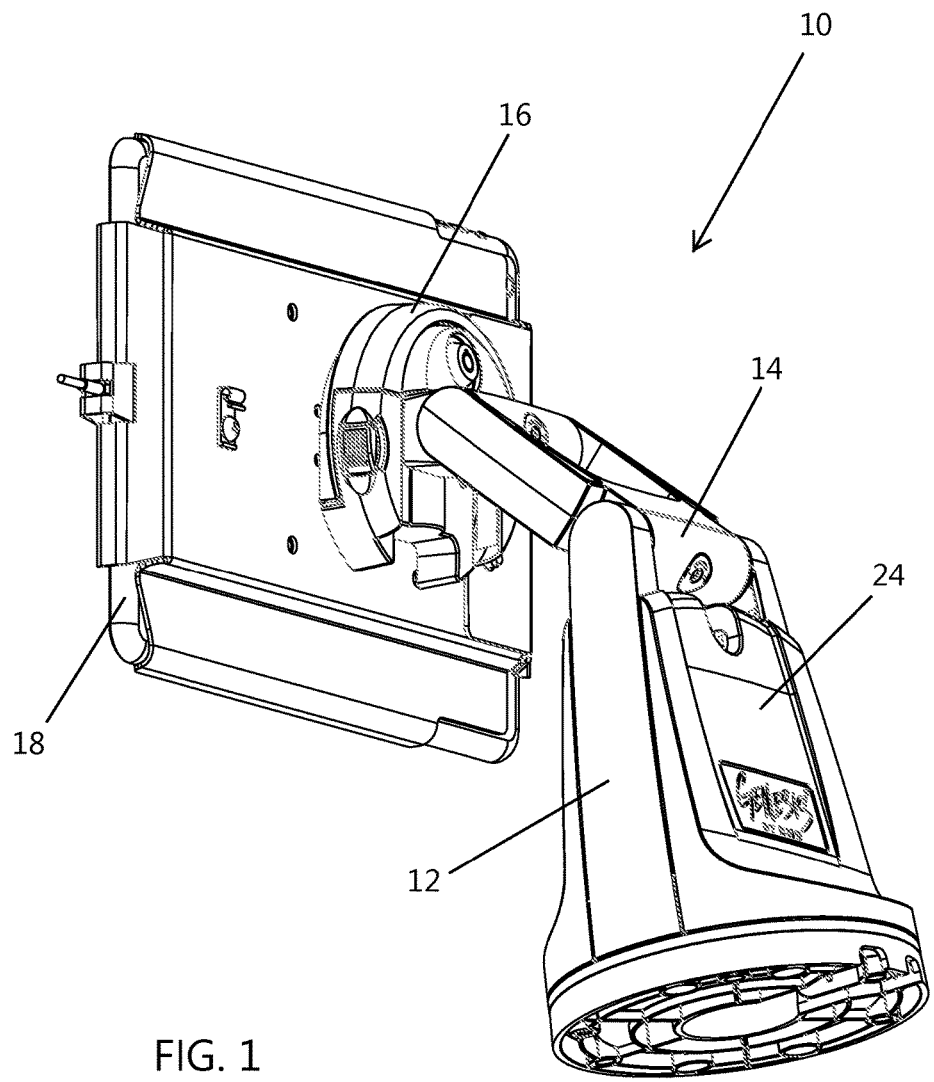
FIG. 1 is a front left lower perspective view of an electronic tablet stand in accordance with an embodiment of the invention, illustrating an electronic tablet retained in the stand.
Figure 2:
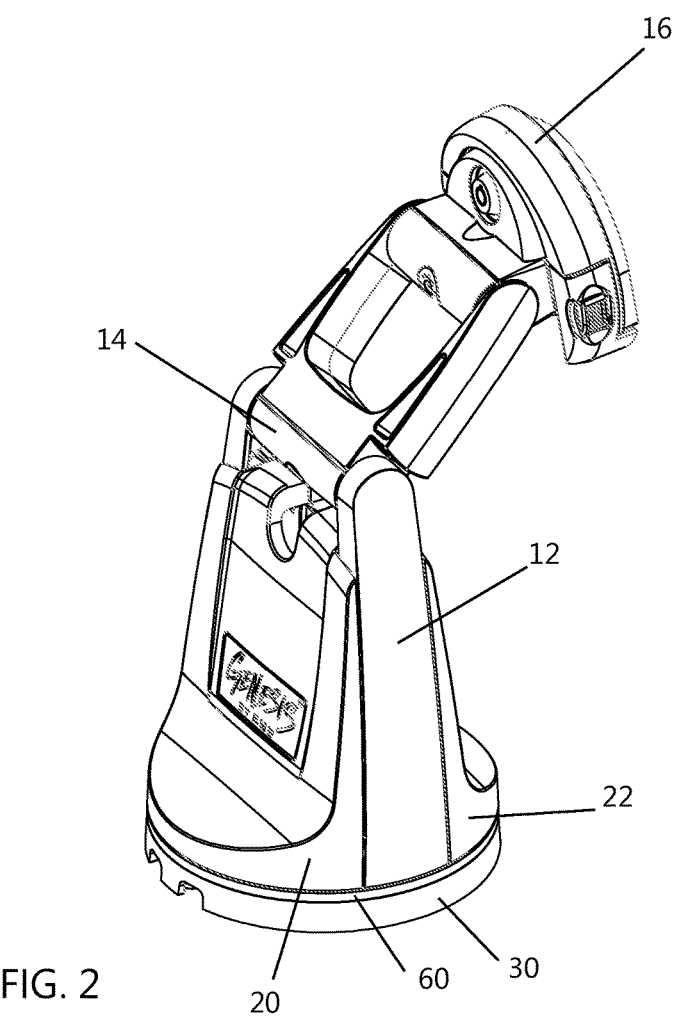
FIG. 2 is a front upper right perspective view of an electronic tablet stand of the type shown in FIG. 1.
Figure 3:
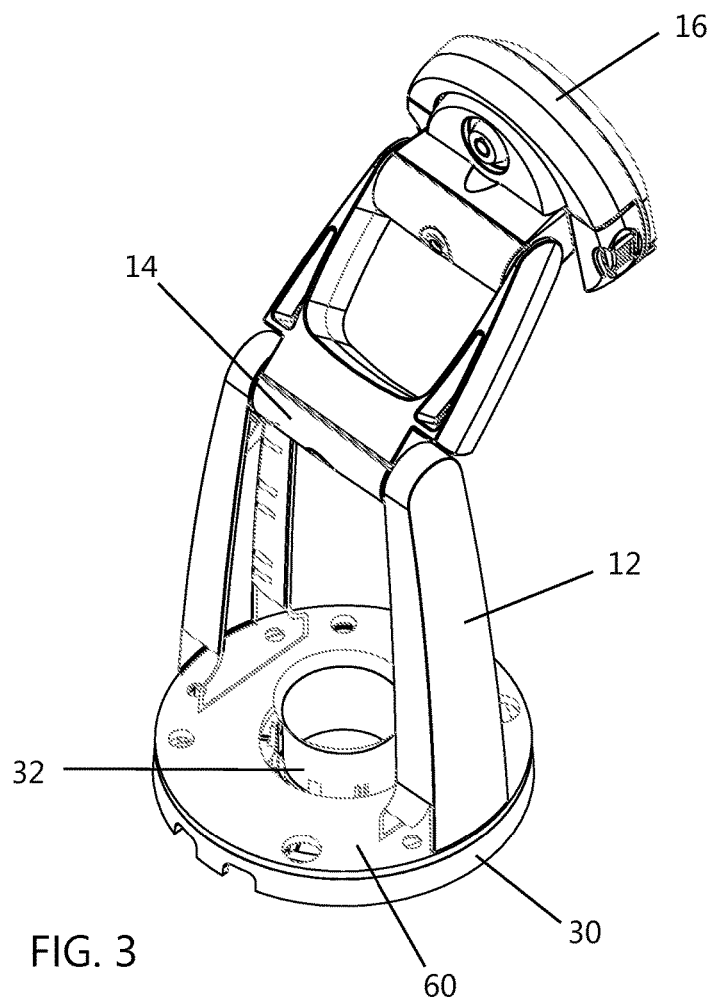
FIG. 3 is a front upper right perspective view of an electronic tablet support stand in accordance with an embodiment of the invention, having a concealment cover removed.

Turning attention now to FIGS. 1-3, a tablet holder stand 10 is shown generally including a tablet stand 12, tablet holder 16, tablet 18, cover 24 and base 30. The tablet stand 12 may include articulating joints 14 and a two part shield 20 and 22 that forms the cover 24. The tablet stand 12 is mounted or attached to the intermediate plate 60 with screws 60 or other known suitable attachment members. The tablet stand 12 and intermediate plate 60 are aligned with the base 30 such that column 30 extending from the base 30 extends through center hole or aperture 62 of the intermediate plate. The shields 20 and 22 that form cover 24 conceals access to the column 32 of the base 30.

Figure 4:
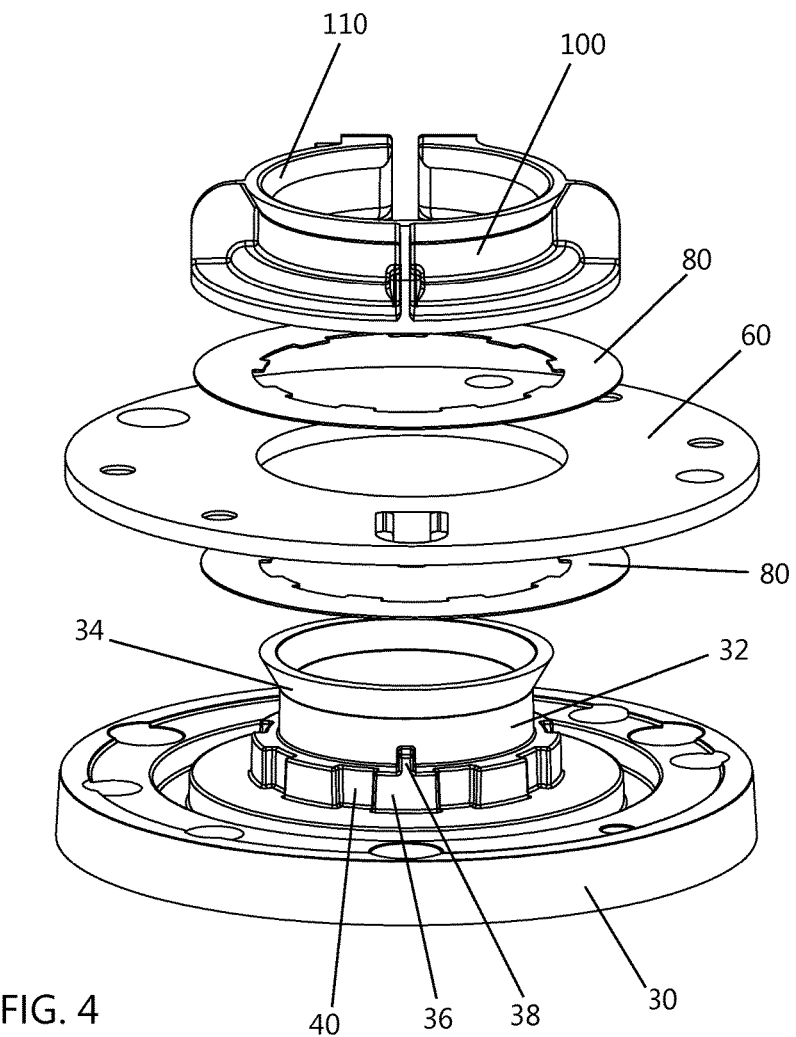
FIG. 4 is an exploded upper perspective view of the table mount base, intermediate plate, spacer rings, and annular collar in accordance with an embodiment of the invention.
Figure 5:
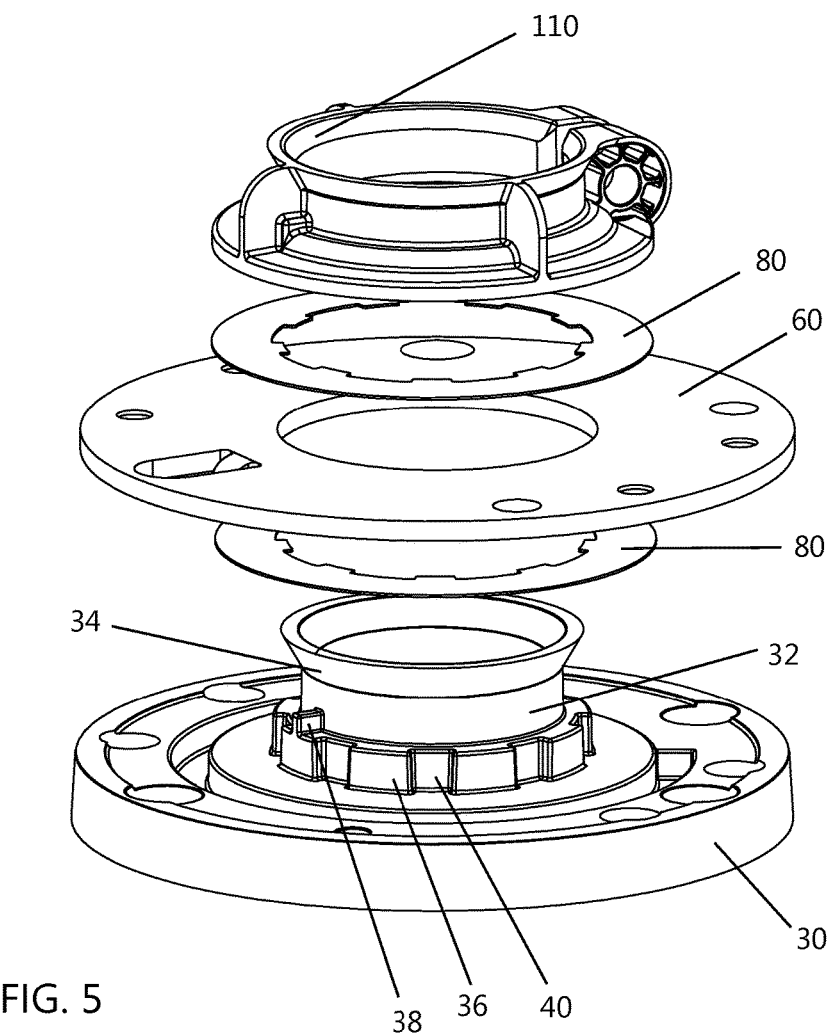
FIG. 5 is an exploded upper perspective view of the table mount base, intermediate plate, spacer rings and annular collar in accordance with an embodiment of the invention.
Figure 6:
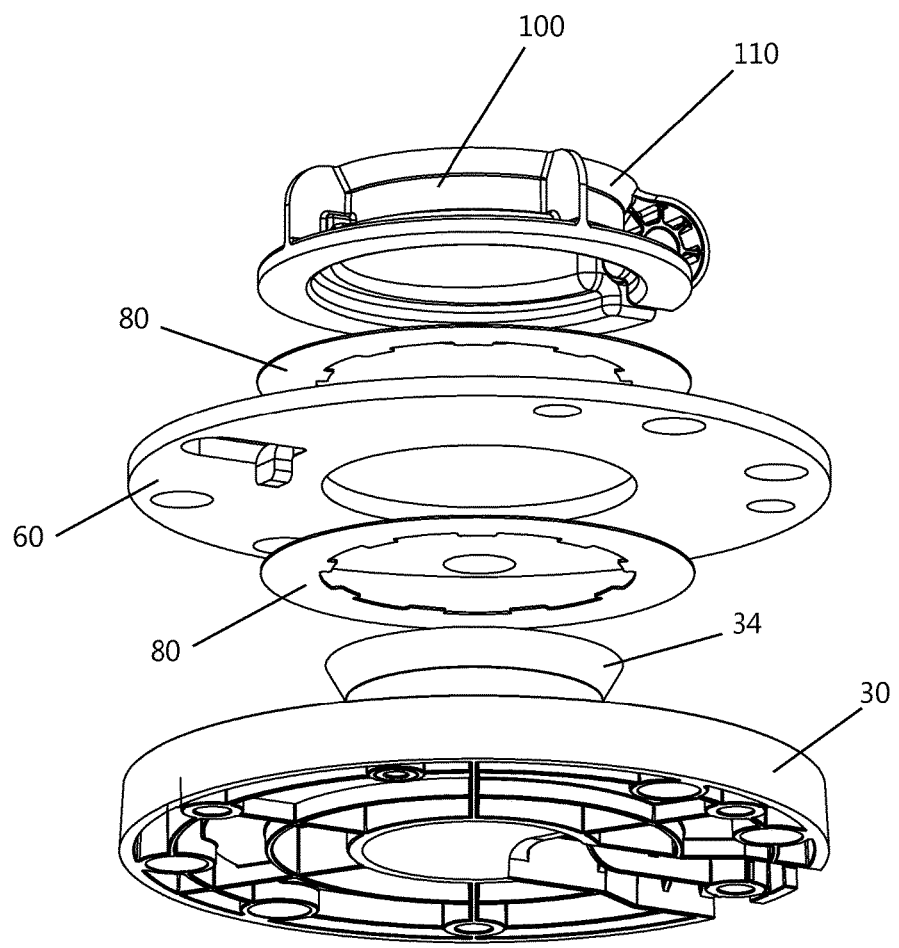
FIG. 6 is an exploded lower perspective view of the table mount base, intermediate plate, spacer rings, and diameter variable collar in accordance with an embodiment of the invention.

The combination of the base 30, intermediate plate 60 and collar 100 provides a constricting mechanism that adjusts to apply a varied restriction on an ability to rotate the tablet stand 12. With minor adjustment to the constricting mechanism a significant restriction against rotation is achieved between the base 30, intermediate plate 60 and collar 100. FIGS. 4-6 further illustrates the constricting mechanism which includes base 30, spacers 80, intermediate plate 60, and collar 100. Base 30 includes column 32 and an annular positive locating ring or flange 36 having a key member 38 and notches 40 formed in the flange. Spacer rings 80 includes notches 82 that align and engage with the notches formed in the annular ring 36 of the base 30. An upper surface 70 of the intermediate plate 60 supports the annular collar 100. Annular collar includes an inner ledge 114 and keyway or slot 116 (see FIG. 15) that mate with the flange 36 and key 38 of the base 30. When the mating key 38 and keyway 116 interlock, the collar 100 and base 30 rotate together.

Figure 7:
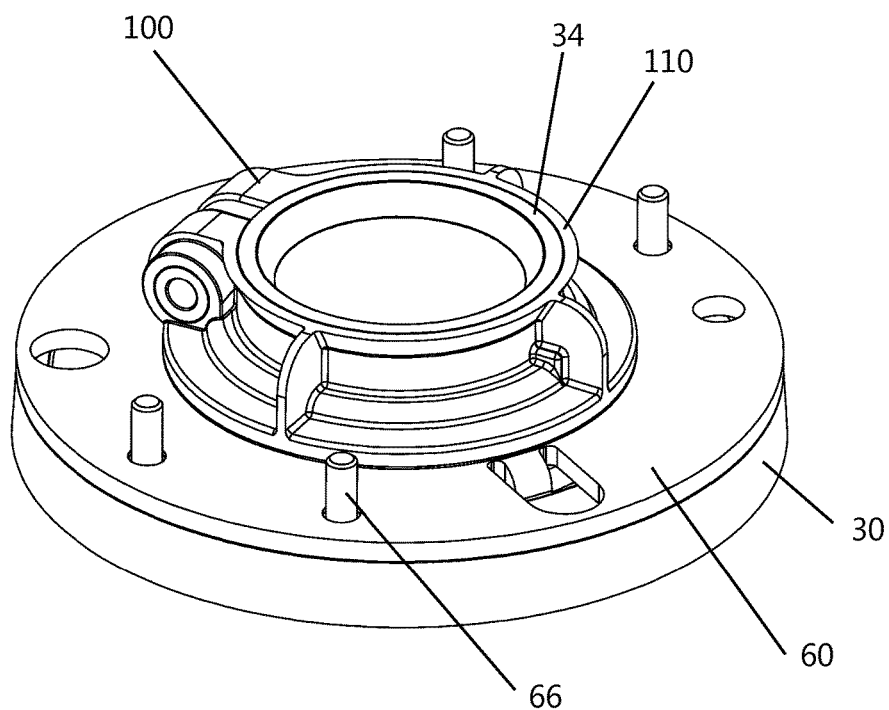
FIG. 7 is an upper perspective view of an assembled table mount base, intermediate plate and annular collar in accordance with an embodiment of the invention.
Figure 8:
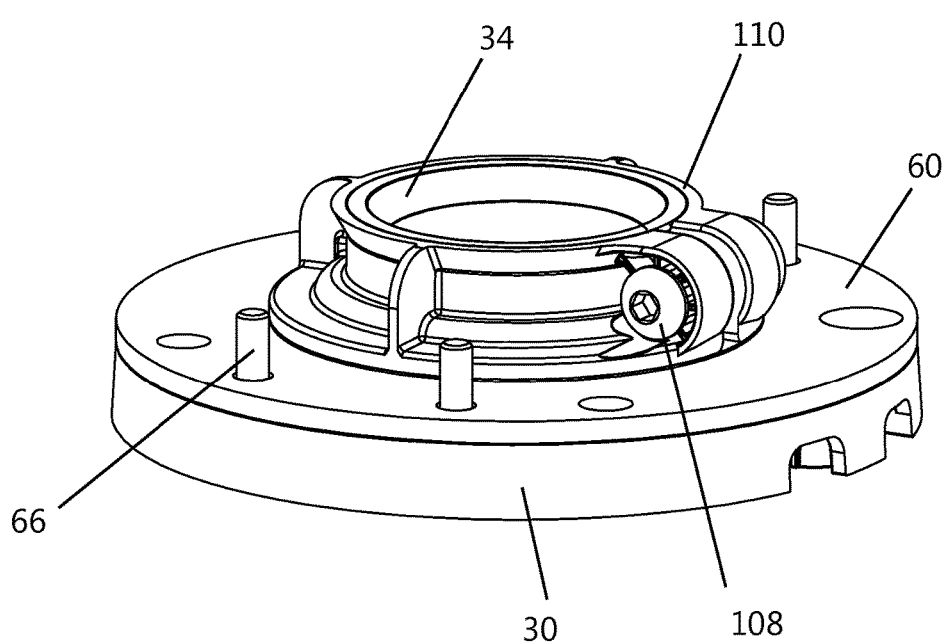
FIG. 8 is an upper perspective view of an assembled table mount base, intermediate plate and annular collar in accordance with an embodiment of the invention.
Figure 9:
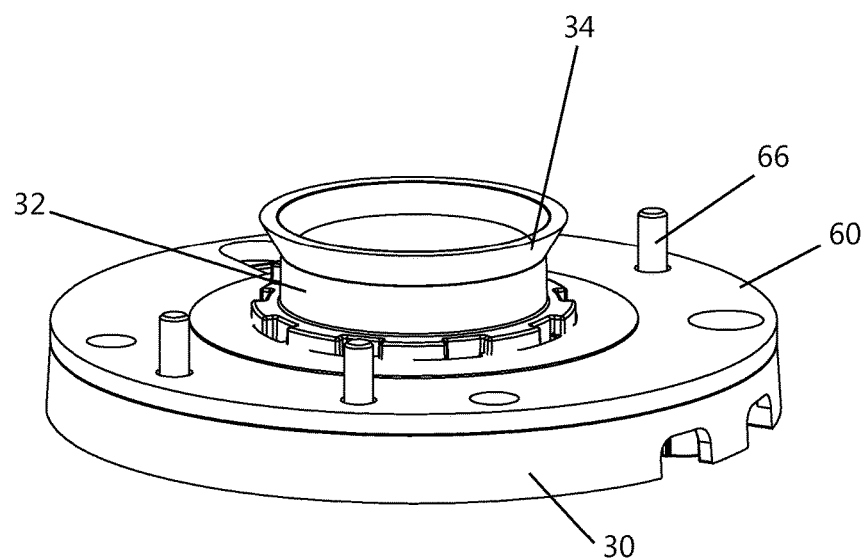
FIG. 9 is an upper perspective view of a table mount base of the type shown in FIG. 8 and showing the intermediate plate positioned on the base and showing the annular collar removed.

FIGS. 7-9 further illustrates the engagement of the intermediate plate 60 with the annular collar 100 and base 30. Annular collar 100 is expandable and contractible and fits around column 32 so that top annular chamfer 110 engages the downward facing bevel 34 of the column 32 and a bottom support surface 112 contacts spacer ring 80 and engages the intermediate plate 60. Tablet stand 12 mounting screws 66 are shown extending through mount holes 64 formed in the intermediate plate 60. The screws 66 securely fasten the stand 12 to the intermediate plate 60. A screw or tension member 108 is used to reduce the spacing of expansion slot 102 and thereby reduce the inner diameter of the aperture 120 extending through the collar 100. When the inner diameter is reduced the chamfer 110 slides down bevel 34 forcing the bottom surface 112 of the collar 100 against the spacer and intermediate plate 60 and indirectly forcing the base 30 against a second spacer and lower surface 72 of the intermediate plate 60.

Figure 10:
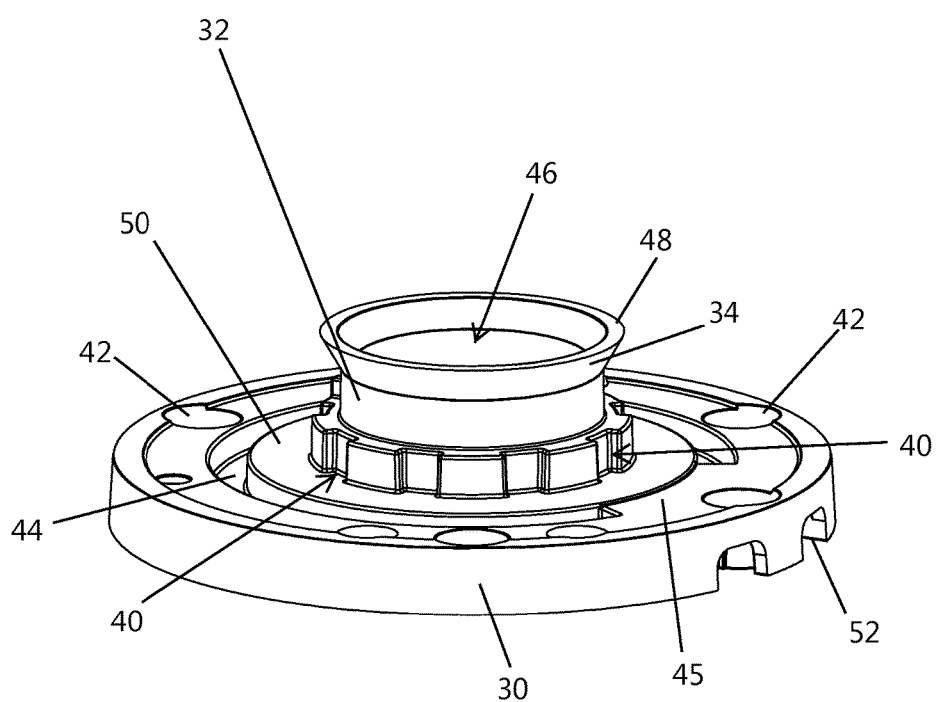
FIG. 10 is an upper perspective view of the table mount base in accordance with an embodiment of the invention.
Figure 11:
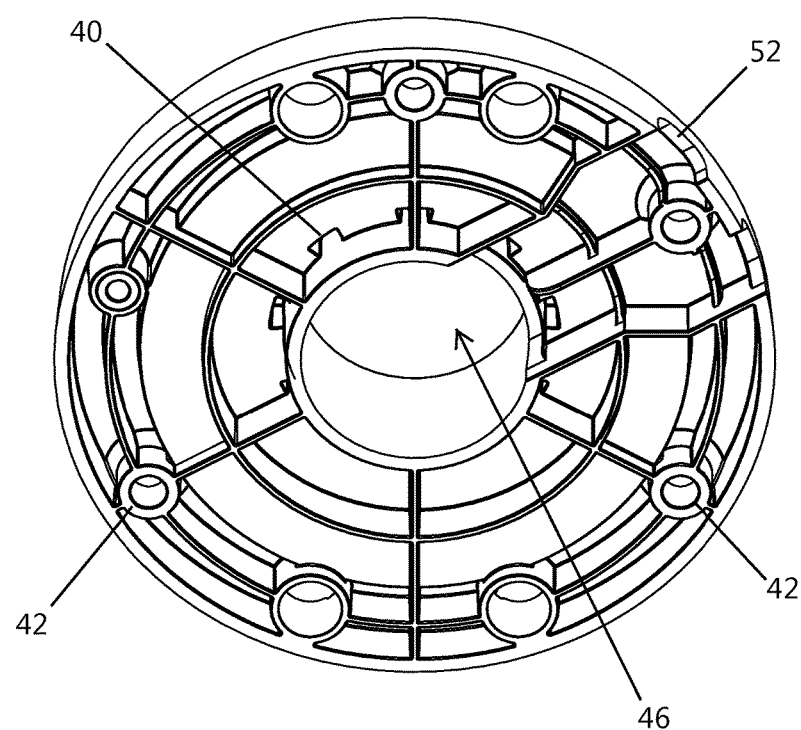
FIG. 11 is a lower perspective view of the table mount base of the type shown in FIG. 10.

With reference to FIGS. 10 and 11 the base 30 is further illustrated. Specifically, base 30 includes column 32 having a downward facing bevel 34 formed on an outer, upper surface 48 of the column 32. Mount holes 42 extend through the base 30 and are adapted to receive fasteners that mount the base 30 to a counter or table, for example. An annular slot 44 is formed in the base 30 and is adapted to receive tab 68 that extend downward from the intermediate plate 60. A rotation stop 45 is positioned in the slot 44 and restricts that tab 68 and intermediate plate 60 from being able to make a complete 360 degree rotation about the column 32 and base 30. Without limitation intended, the stop 45 is shown being made as an integral portion of the base 30. Inner aperture 46 extends through the column and base and suitable to receive wiring extending there through. Base 30 further includes an annular support surface 50 on which the intermediate plate 60 ad spacer ring 80 rest. The bottom of the base 30 further includes channel or guide 52 through which tablet wires may be routed.

Figure 12:
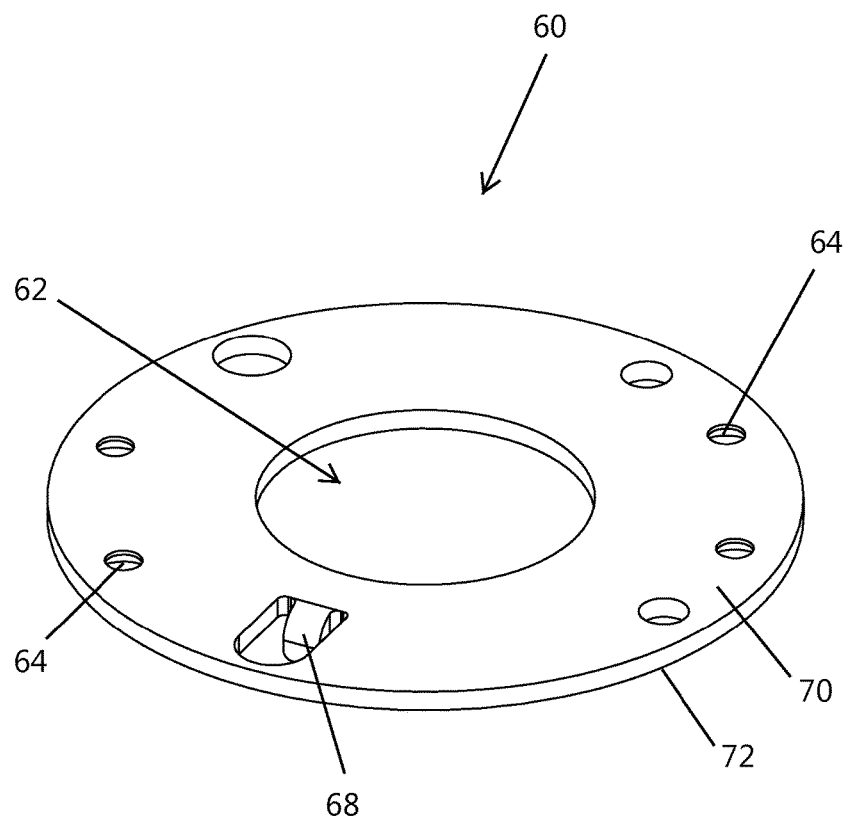
FIG. 12 is an upper perspective view of the intermediate plate in accordance with an embodiment of the invention.
Figure 13:
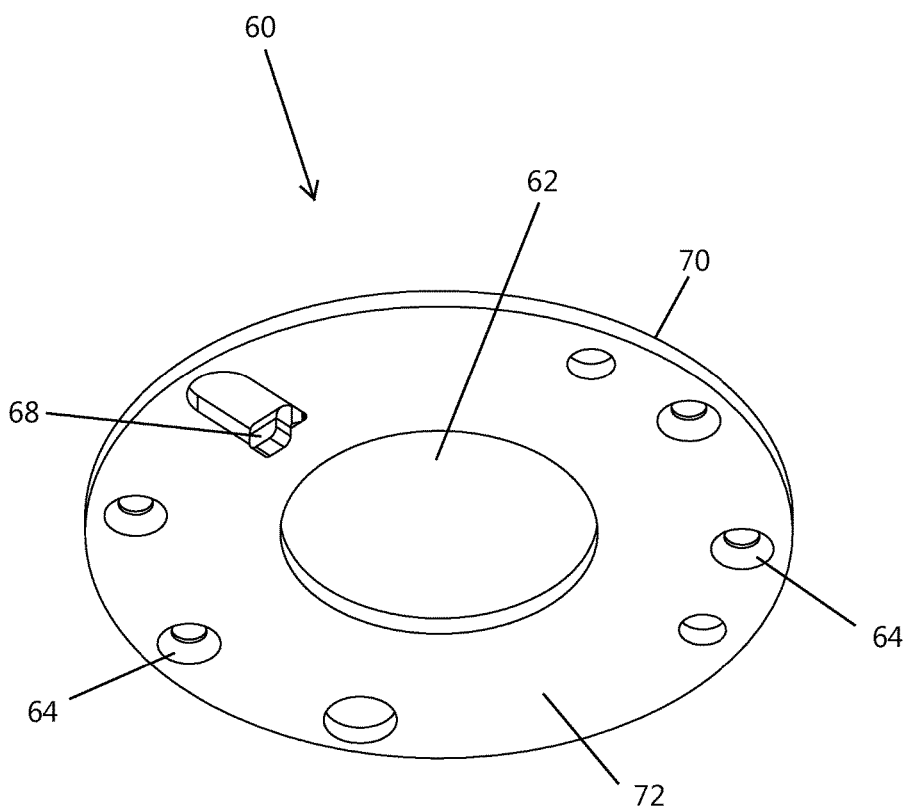
FIG. 13 is a lower perspective view of the intermediate plate in accordance with an embodiment of the invention.
Figure 16:
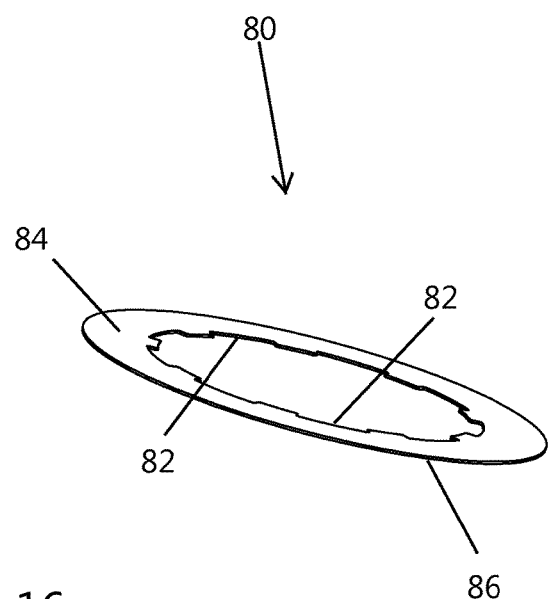
FIG. 16 is an upper perspective view of the spacer ring in accordance with an embodiment of the invention.

FIGS. 12 and 13 illustrate the intermediate plate 60 of the present invention. The plate 60 includes tab 68 extending from a lower surface 72. Also formed in the plate 60 is a center bore 62 and relief holes 64 for screws 66. The upper surface 70 provides support for an optional spacer ring 80 and annular collar 100. The spacer ring illustrated in FIG. 16 includes a top surface 84 and bottom surface 86. Notches 82 are formed along an inner surface of a bore extending through the ring. The rings are constructed of a material having a low coefficient of friction to aid rotation of the plate between the collar and base when a slight tension is applied to the collar.

Figure 14:
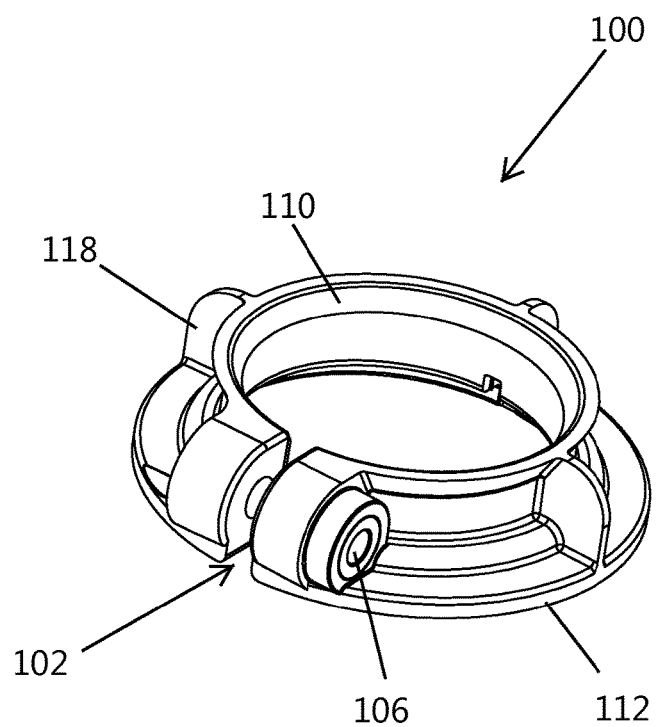
FIG. 14 is an upper perspective view of the annular collar in accordance with an embodiment of the invention.
Figure 15:
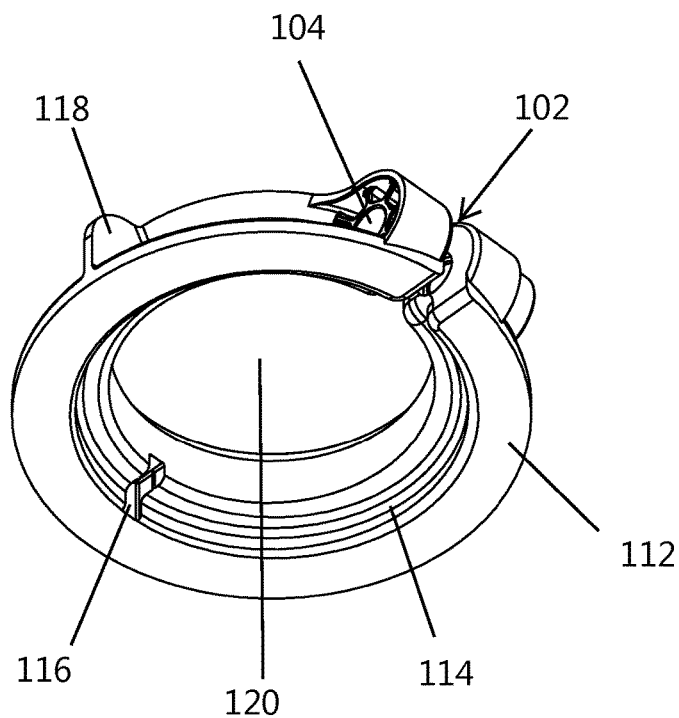
FIG. 15 is a lower perspective view of the annular collar in accordance with an embodiment of the invention.

FIGS. 14 and 15 further illustrate the expandable and contractible annular collar 100 of the present invention. The collar includes a bore 120 extending through the collar from an upper surface to a bottom support surface 112 of the collar 100. A relief bore 104 extends through the collar forming a hole for the tensioning screw 108 to extend. The bore on one side of the slot is threaded 106 so that when the screw is turned to tighten, a head of the screw presses against the collar and reduces the separation distance of the slot 102. Annular chamfer 110 is formed on an inner top edge of the inner center hole 120. Further, annular ledge 114 and keyway 116 are formed on a lower inner edge of the center hole 120. Wings 118 extend outward from the collar may be used to help align and engage the collar 100 to column 32 of base 30.

In use, an electronic tablet 18 may be aligned and engaged with holder 16 fixed to the tablet stand 12. The tablet stand 12 may twist and rotate at articulating joints 14 and the tablet stand 12 and plate 60 may rotate about the base 30 and annular collar 100. In this manner, the tablet stand 12 may be oriented at a desired viewing angle. The user may then restrict rotation of the tablet stand 12 by tightening screw 108 against collar 100. The tightening of screw 108 causes an increase in tension between the expandable and contractible annular collar which then reduces the inner diameter of the collar and caused the collar to slide down the bevel of the column of the base 30. Further, by applying tension to the collar, both an upward and downward force are applied against the intermediate plate by the base 30 and collar 100.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An apparatus to support a holder for an electronic tablet, said apparatus comprising:
    a base having a column extending upward from the base, said column having an annular bevel formed on an outer surface of the column;
    a rotatable intermediate plate having a top and bottom surface and an aperture extending through the plate from the top to bottom surface, wherein said column of the base extends through said aperture and a portion of said base is below the bottom surface of said intermediate plate;
    an expandable and contractible annular collar sized to encompass and engage at least a portion of said column above the top surface of said intermediate plate, wherein said collar includes an annular chamfer formed on an inner top edge of said annular collar;
    said annular chamfer and said annular bevel sized to engage together when said collar is contracted and a diameter of said collar is reduced, and wherein reducing the diameter of said annular collar forces said collar downward towards the top surface of said intermediate plate and forces the base upward towards the bottom surface of said intermediate plate.

2. The apparatus as recited in claim 1, further including a mating key and keyway, the key being formed on one of said collar and column, wherein engaging the mating key and keyway locks said collar from rotating about said column.

3. The apparatus as recited in claim 1, further including spacer rings positioned between said intermediate plate.

4. The apparatus as recited in claim 3, wherein said spacer rings reduce friction between said intermediate plate and said collar.

5. The apparatus as recited in claim 1, wherein said annular collar includes a tensioning member to reduce an inner diameter of the annular collar.

6. The apparatus as recited in claim 1, wherein said base further includes an annular slot formed in said based and said intermediate plate includes a tab extending downward from said bottom surface of said intermediate plate, wherein said tab is sized and positioned to slide in said slot of said been when said intermediate plate is rotated about said column.

7. The apparatus as recited in claim 1, further including a cover to conceal said annular collar.

8. An apparatus to support a holder for an electronic tablet, said apparatus comprising:
   a base having a column extending upward from the base, said column having an annular bevel formed on an outer surface of the column;
   a rotatable intermediate plate having a top and bottom surface and an aperture extending through the plate from the top to bottom surface, wherein said column of the base extends through said aperture and a portion of said base is below the bottom surface of said intermediate plate;
   an expandable and contractible annular collar sized to encompass and engage at least a portion of said column above the top surface of said intermediate plate, wherein said collar includes an annular chamfer formed on an inner top edge of said annular collar; and
   a tablet stand attached to said intermediate plate;
   wherein said annular chamfer and said annular bevel sized to engage together when said collar is contracted and a diameter of said collar is reduced, and wherein reducing the diameter of said annular collar forces said collar downward towards the top surface of said intermediate plate and forces said base towards the bottom surface of said intermediate plate.

9. The apparatus as recited in claim 8, further including a mating key and keyway, the keyway being formed on said collar and the key being formed on the column, wherein engaging the mating key and keyway locks said collar from rotating about said column.

10. The apparatus as recited in claim 8, further including spacer rings positioned between said intermediate plate and said collar.

11. The apparatus as recited in claim 10, wherein said spacer rings reduce friction between said intermediate plate and said collar.

12. The apparatus as recited in claim 8, wherein said annular collar includes a tensioning member to reduce an inner diameter of the annular collar.

13. The apparatus as recited in claim 8, wherein said base further includes an annular slot formed in said based and said intermediate plate includes a tab extending downward from said bottom surface of said intermediate plate, wherein said tab is sized and positioned to slide in said slot of said been when said intermediate plate is rotated about said column.

14. An apparatus to support a holder for an electronic tablet, said apparatus comprising:
   a base having a column extending upward from the base, said column having an annular bevel formed on an outer surface of the column;
   an intermediate plate having a top and bottom surface and an aperture extending through the plate from the top to bottom surface, wherein said column of the base extends through said aperture and a portion of said base is below the bottom surface of said intermediate plate;
   an expandable and contractible annular collar sized to encompass and engage at least a portion of said column above the top surface of said intermediate plate, wherein said collar includes an annular chamfer formed on an inner top edge of said annular collar, and wherein said annular collar includes a tensioning member to reduce an inner diameter of the annular collar;
   a mating key and keyway, wherein engaging the mating key and keyway locks said collar from rotating about said column;
   wherein said base further includes an annular slot formed in said based and said intermediate plate includes a tab extending downward from said bottom surface of said intermediate plate, wherein said tab is sized and positioned to slide in said slot of said been when said intermediate plate is rotated about said column; and
   wherein said annular chamfer and said annular bevel sized to engage together when said collar is contracted and a diameter of said collar is reduced, and wherein reducing the diameter of said annular collar forces said collar downward towards the top surface of said intermediate plate and forces the base upwards towards the bottom surface of said intermediate plate.

15. The apparatus as recited in claim 14, further including spacer rings positioned between said intermediate plate.

16. The apparatus as recited in claim 15, wherein said spacer rings reduce friction between said intermediate plate and said collar.

17. The apparatus as recited in claim 14, further including a tablet stand attached to said intermediate plate.

18. The apparatus as recited in claim 14, further including a cover to conceal said annular collar.

* * * * *

UNITED STATES PATENT AND TRADEMARK OFFICE
CERTIFICATE OF CORRECTION

PATENT NO. : 9,968,188 B1
APPLICATION NO. : 15/206375
DATED : May 15, 2018
INVENTOR(S) : Peter J. Floersch et al.

Page 1 of 1

It is certified that error appears in the above-identified patent and that said Letters Patent is hereby corrected as shown below:

In the Claims

Claim 6 at Column 7, Line 5, "further includes an annular slot formed in said based and" should read -- further includes an annular slot formed in said base and --;

Claim 13 at Column 8, Line 2, "further includes an annular slot formed in said based and" should read -- further includes an annular slot formed in said base and --; and Claim 14 at Column 8, Line 29, "in said based and said intermediate plate includes a tab" should read -- in said base and said intermediate plate includes a tab --.

Signed and Sealed this
Eighteenth Day of September, 2018

Andrei Iancu
*Director of the United States Patent and Trademark Office*